July 25, 1933.                A. ROSNER                1,919,531
                                BRAKE
                          Filed Nov. 22, 1930            2 Sheets-Sheet 1

INVENTOR.
ADOLPH ROSNER
BY
M. W. McConkey
ATTORNEY

July 25, 1933. A. ROSNER 1,919,531
BRAKE
Filed Nov. 22, 1930    2 Sheets-Sheet 2

INVENTOR.
ADOLPH ROSNER
BY M. W. McConkey
ATTORNEY

Patented July 25, 1933

1,919,531

UNITED STATES PATENT OFFICE

ADOLPH ROSNER, OF SOUTH BEND, INDIANA, ASSIGNOR TO BENDIX BRAKE COMPANY, OF SOUTH BEND, INDIANA, A CORPORATION OF ILLINOIS

BRAKE

Application filed November 22, 1930. Serial No. 497,431.

This invention relates to means for operating brakes and the like, and is illustrated as embodied in a novel arrangement of the parts of a Bowden control mechanism such that both the tension on the cable or its equivalent and the reaction on the conduit which incloses the cable are taken on a lever or some equivalent operating part in such a manner that both of them tend to operate this part in the same sense, that is in the case of a lever they both tend to rock the lever in the same direction. This is convenient, not only in that it eliminates the necessity of a fixed support for the end of either the conduit or the tension element such as the cable, but also in some arrangements it balances the forces tending to shift bodily the lever or a shaft on which the lever is mounted, so that there is no binding of the lever or the shaft against the mounting therefor.

In order more fully to illustrate the principle of the invention, I show in the accompanying drawings, several different embodiments illustrating how the conduit can be connected to one part of a lever to turn it by its reaction, while the cable or its equivalent is connected to another part of the same lever or to a part attached thereto so that tension thereon tends to turn the lever in the same direction as the reaction from the conduit.

In one arrangement, one embodiment of which is shown in Figures 1 and 2, the lever is in the form of a bell crank having arms extending substantially at right angles to each other and the conduit is connected in a straight line to one arm while the cable turns through approximately 90° and is attached to the other arm, preferably with a guide such as a segmental roller or the like.

In another arrangement, illustrated more specifically in Figure 3, the conduit is connected to one member fixed on a cam shaft or the like and exerting a leverage thereon while the cable is connected to this leverage member by means of a lever which is pivoted thereon and which has an external fulcrum such that its thrust on the first member is in the same direction about the shaft as the reaction of the conduit. In this arrangement there is preferably an adjustment between the leverage member which acts on the shaft and a member on the shaft itself so that the device may be adjusted for wear of the brake. I also prefer to form the leverage member as a housing inclosing the end of the cable or its equivalent and within which the cable operated lever is arranged to swing.

A third embodiment of the invention, illustrated by Figure 4, includes a pair of oppositely arranged toggles, one of which is arranged to be operated by the reaction on the conduit and the other of which is operated by the tension on the cable or its equivalent. I prefer to connect the toggles to opposite arms of a lever which may, if desired, be mounted on the brake cam shaft or its equivalent in such a manner that the reaction of the conduit and the tension on the cable both tend to turn the lever in the same direction, but balance their tendencies to shift the lever and the shaft bodily.

The above and other objects and features of the invention, including various desirable constructions and mechanical details, will be apparent from the following description of the three illustrative embodiments shown in the accompanying drawings, in which.

Figure 1:
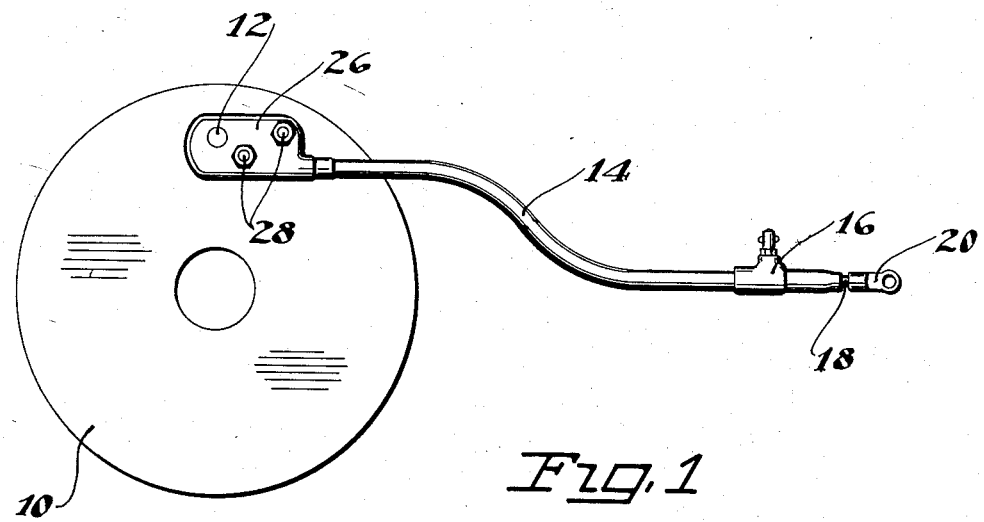
Figure 1 is a diagrammatic elevation looking outwardly toward the backing plate of a brake and showing the arrangement of the novel Bowden control with respect to the brake and its cam shaft.

The parts of the brake shown in Figure 1 include the backing plate 10 and a cam shaft or the like 12 arranged to be operated by novel means, such as a Bowden control including a flexible housing 14 of any desired type attached by a fitting 16 to the chassis frame of the automobile at its end opposite the brake and containing a cable or an equivalent flexible tension element 18 slidably arranged therein and formed with a suitable fitting 20 for attachment to the usual brake hookup. The present invention relates to the construction and arrangement of the parts through which the Bowden control 14—18 operates the cam shaft 12 or its equivalent.

Figure 2:
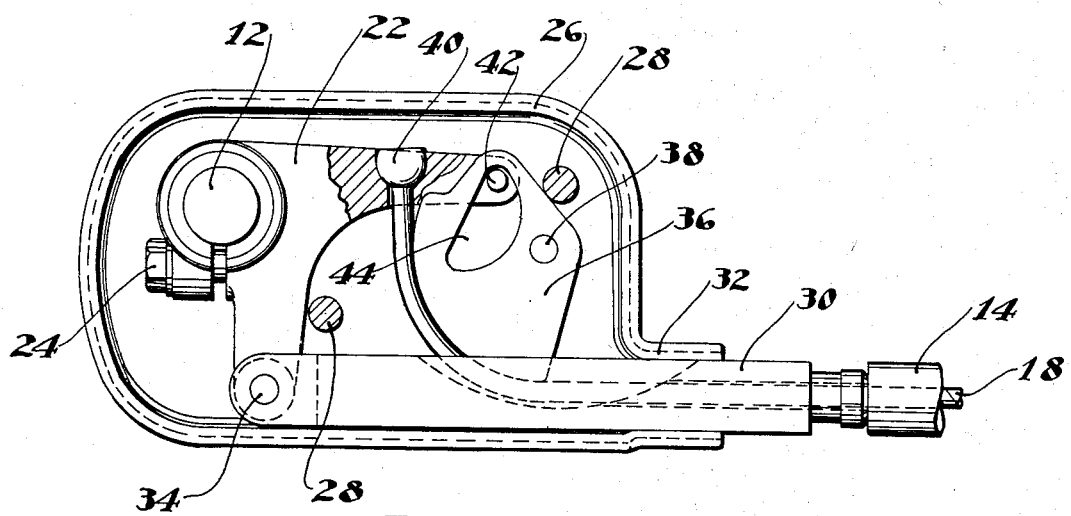
Figure 2 is a section through the part of the control mounted on the brake backing plate as shown in Figure 1.

In the arrangement of Figures 1 and 2, a bell crank lever 22 is formed with arms substantially at right angles to each other and has a slotted hub sleeved on the shaft 12 and adjustably clamped thereto by means such as a draw bolt 24. The lever 22 is arranged inside of a housing 26 formed as a steel stamping secured to the backing plate 10 by means such as bolts 28. The end of the conduit 14 in this arrangement is in the form of a fitting 30 slidably arranged in a tubular outlet 32 of the housing 26, and connected by means such as a pivot 34 to the lower one of the arms of the bell crank lever 22.

The tension element 18 passes inside of the housing 26 through the fitting 30 and there turns substantially at right angles about a segmental roller 36 mounted on a pivot 38 carried by the housing 26 and has at its end a ball member 40 seated in a substantially semi-spherical socket in the other arm of the lever 22. The position of the various parts when the brake is released is determined by engagement of the segmental roller 36 with one of the bolts 28, the upper arm of the lever 22 having a pin 42 which extends into an opening 44 in the segmental roller and which engages the upper end of the opening to determine the position of the lever 22 when the brake is released. The opening 44 is large enough so that the movement of the pin 42 in applying the brake does not cause it to bind in the opening.

It will be seen that when the brake is applied and tension is exerted on the element 18 through the usual brake hookup, the tension of this element acts directly on the upper arm of the lever 22 to rock the lever in a clockwise direction to operate the cam shaft 12 or its equivalent to apply the brake. At the same time the tension on the element 18 also causes a reaction on the conduit 14, of which the fitting 30 in effect forms a part, and this reaction acts on the lower arm of the lever 22 also in a direction to rock the lever in a clockwise direction.

Figure 3:
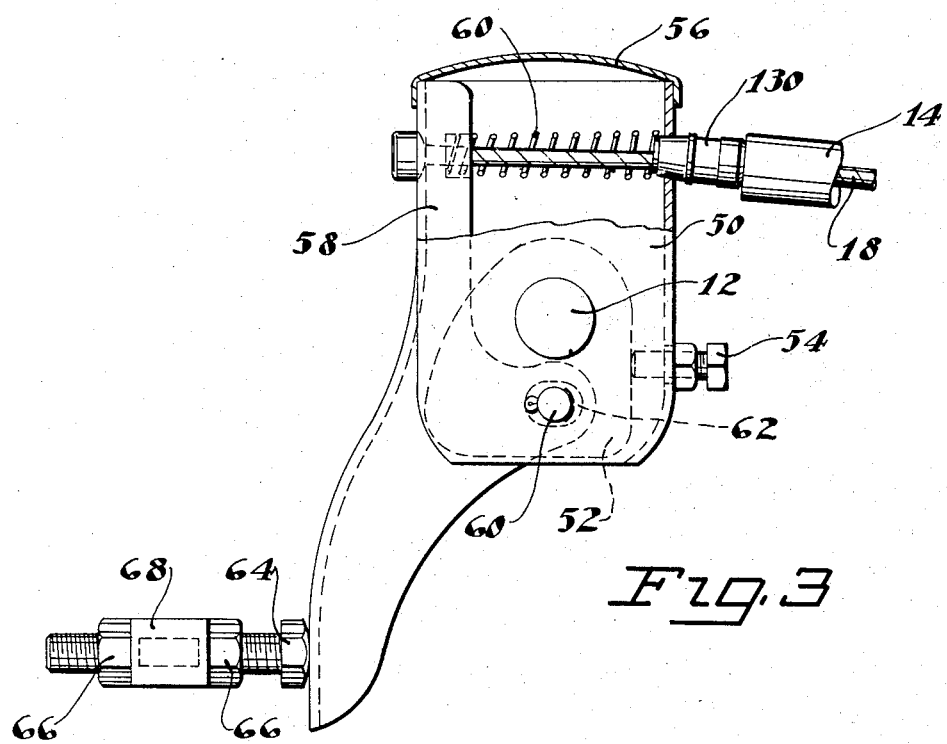
Figure 3 is an elevation, partly broken away in section, of a modified form of the mechanism of the brake and of the control.

In the arrangement of Figure 3, the conduit 14 has at its end a fitting 130 connecting it to a hollow housing or leverage member 50, within which is arranged a part 52 fixed on the cam shaft 12 and adjustably engaged by a set screw 54 carried by the leverage member or housing 50. The top of the housing 50 is shown closed by a stamped cap 56. The left-hand side of the housing or leverage member 50 is open and receives the upper part of a stamped channel-sectioned lever 58 to which the end of the tension element 18 is connected.

If desired, a return spring 60 may be sleeved on the tension element 18 between the lever 58 and the right hand side of the housing or leverage element 50. This spring is compressed when these parts move toward each other during the application of the brake and acts as a return spring tending to return them to their initial positions. An intermediate part of the lever 58 is pivoted to the leverage member or housing 50 by a pivot 60 which passes through a relatively large clearance opening 62 in the member 52 so that the member 52 does not interfere with the movement of the pivot 60. The lower end of the lever 58 engages and fulcrums against a part such as the rounded head of a bolt 64 adjustably mounted, by means such as nuts 66 threaded thereon, in a fitting 68 carried by the backing plate 10.

It will be seen that in this arrangement tension on the cable 18 or its equivalent rocks the lever 58 about the fulcrum 64 and exerts a thrust through the pivot 60 on the leverage member or housing 50 tending to turn it in a counter-clockwise direction. At the same time the reaction from the conduit 14 acts directly on the housing lever member 50 also tending to rock it in a counter-clockwise direction. The movement of the housing or leverage member 50 is transmitted to the cam shaft 12 by the adjustable set screw 54 acting through the member 52 which is fixed on the cam shaft.

Figure 4:
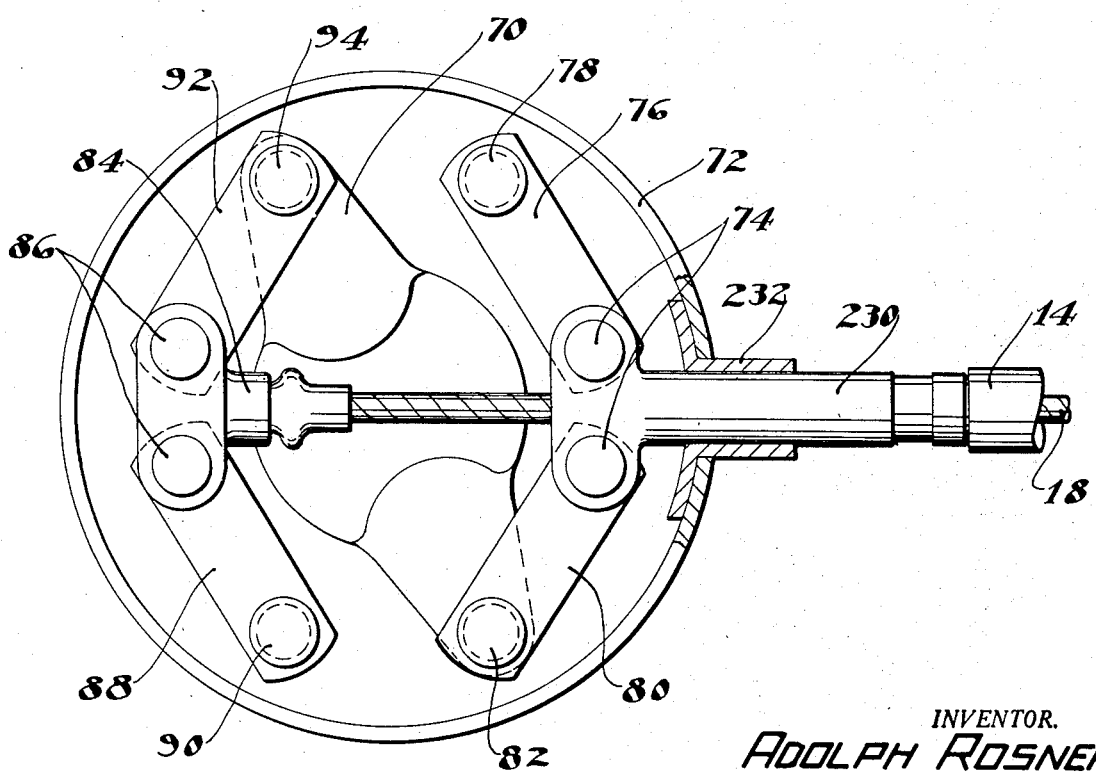
Figure 4 is a section through another modified form of the mechanism of the brake and of the control.

In the arrangement of Figure 4, the cam shaft or its equivalent has integrally forged or otherwise secured to its end a lever 70 having oppositely extending arms and arranged inside of a housing 72 secured to the backing plate 10. In this arrangement, the end of the conduit 14 has a fitting 230 slidably mounted in a tubular outlet 232 of the housing 72 and formed with or having secured thereto at its end a knuckle part connected by means such as pivots 74 to a toggle link 76, mounted at its opposite end on a fixed pivot 78 carried by the housing 72, and to a toggle link 80 connected at its opposite end by means such as a pivot 82 to the lower arm of the two-arm lever 70.

The end of the tension element 18 also carries a fitting 84 which in effect forms the knuckle of a toggle and which is connected by means such as pivots 86 to a lower toggle link 88 having its lower end mounted on a fixed pivot 90 carried by housing 72 and to an upper toggle link 92 having its upper end connected by means such as a pivot 94 to the upper arm of the two-arm lever 70.

In this arrangement it will be seen that, since the two toggles face toward each other, tension on the element 18 tends to straighten the left hand toggle to rock the upper arm of the lever 70 in a clockwise direction while the reaction on the conduit 14 and its fitting 230 tends to straighten the right hand toggle and rock the lower arm of the two-arm lever 70 in a clockwise direction. Thus the tension and reaction both tend to turn the lever in the same direction while the forces tending to shift the lever bodily are balanced against each other.

While three illustrative embodiments have been described in detail, it is not my intention to limit the scope of the invention to these particular embodiments or otherwise than by the terms of the appended claims.

I claim:

1. A lever having oppositely extending parts, a pair of toggles each comprising pivotally connected links with the end of one link connected to one of said parts of the lever and with the end of the other link mounted on a fixed pivot, in combination with a conduit reacting in compression on the knuckle of one toggle and tending to straighten it, and a tension element in the conduit and pulling on the knuckle of the other toggle and tending to straighten it.

2. Operating means comprising a pair of oppositely-facing toggles, in combination with a conduit reacting in compression on the knuckle of one toggle and tending to straighten it, and a tension element in the conduit and pulling on the knuckle of the other toggle and tending to straighten it.

3. Operating means comprising a pair of oppositely-facing toggles, in combination with a conduit reacting in compression on the knuckle of one toggle and tending to straighten it, and a tension element in the conduit and pulling on the knuckle of the other toggle and tending to straighten it, together with a shaft turned in the same direction by straightening movement of both toggles.

4. Operating means comprising a pair of oppositely-facing toggles, in combination with a conduit reacting in compression on the knuckle of one toggle and tending to straighten it, and a tension element in the conduit and pulling on the knuckle of the other toggle and tending to straighten it, together with a shaft having two arms connected respectively to the two toggles and turned in the same direction by straightening movement of both toggles.

5. Operating means comprising a pair of oppositely-facing toggles, in combination with a conduit reacting in compression on the knuckle of one toggle and tending to straighten it, and a tension element in the conduit and pulling on the knuckle of the other toggle and tending to straighten it, together with oppositely-extending arms connected respectively to the two toggles.

6. Operating means comprising a pair of oppositely-facing toggles, in combination with a conduit reacting in compression on the knuckle of one toggle and tending to straighten it, and a tension element in the conduit and pulling on the knuckle of the other toggle and tending to straighten it, together with a shaft turned in the same direction by straightening movement of both toggles, together with an operating device actuated in the same sense by straightening of both toggles.

7. Operating mechanism comprising a conduit and a tension element within the conduit, in combination with a leverage member engaged by the conduit and rocked by reaction on the conduit, and a lever connected to the tension element and pivoted on the leverage member and rocked about a fulcrum by tension on said element to rock the leverage member in the same direction as reaction on the conduit.

8. Operating mechanism comprising a conduit and a tension element within the conduit, in combination with a leverage member engaged by the conduit and rocked by reaction on the conduit, and a lever connected to the tension element and pivoted on the leverage member and rocked about a fulcrum by tension on said element to rock the leverage member in the same direction as reaction on the conduit, together with an externally supported fulcrum for said lever.

9. Operating mechanism comprising a conduit and a tension element within the conduit, in combination with a leverage member engaged by the conduit and rocked by reaction on the conduit, and a lever connected to the tension element and pivoted on the leverage member and rocked about a fulcrum by tension on said element to rock the leverage member in the same direction as reaction on the conduit, together with an adjustable fulcrum for said lever.

10. Operating mechanism comprising a conduit and a tension element within the conduit, in combination with a leverage member engaged by the conduit and rocked by reaction on the conduit, and a lever connected to the tension element and pivoted on the leverage member and rocked about a fulcrum by tension on said element to rock the leverage member in the same direction as reaction on the conduit, together with a shaft and adjustable means for associating the leverage device and the shaft.

11. Operating mechanism comprising a conduit and a tension element within the conduit, in combination with a leverage member engaged by the conduit and rocked by reaction on the conduit, and a lever connected to the tension element and pivoted on the leverage member and rocked about a fulcrum by tension on said element to rock the leverage member in the same direction as reaction on the conduit together with a return spring arranged between the leverage device and the lever.

12. Operating mechanism comprising a leverage device in the form of a hollow housing, a lever pivotally mounted within said housing, a conduit engaging and reacting against the housing, and a tension element passing through the conduit and through the housing and connected to the lever.

13. Operating mechanism comprising a leverage device in the form of a hollow housing, a lever pivotally mounted within said housing, a conduit engaging and reacting against the housing, and a tension element passing through the conduit and through the housing and connected to the lever, together with a shaft with which the housing is adjustably associated.

14. Operating mechanism comprising a leverage device in the form of a hollow housing, a lever pivotally mounted within said housing, a conduit engaging and reacting against the housing, and a tension element passing through the conduit and through the housing and connected to the lever, together with a fulcrum for said lever arranged outside of the housing.

15. Operating mechanism comprising a leverage device in the form of a hollow housing, a lever pivotally mounted within said housing, a conduit engaging and reacting against the housing, and a tension element passing through the conduit and through the housing and connected to the lever, together with a fulcrum for the lever mounted independently of the housing.

16. Operating mechanism comprising a leverage device in the form of a hollow housing, a lever pivotally mounted within said housing, a conduit engaging and reacting against the housing, and a tension element passing through the conduit and through the housing and connected to the lever, together with an adjustable fulcrum for the lever.

17. Operating mechanism comprising a leverage device in the form of a hollow housing, a lever pivotally mounted within said housing, a conduit engaging and reacting against the housing, and a tension element passing through the conduit and through the housing and connected to the lever, together with a coil return spring sleeved on the end of the tension element inside of the housing and compressed between the lever and the housing.

18. In a brake, in combination with a backing plate, a rotatable brake applying member mounted thereon, means comprising a conduit for reacting in compression upon said member in one direction, and means comprising a tension element in said conduit for exerting a tension upon said member in a parallel opposite direction, whereby there is no shifting moment acting upon the member while both forces tend to rotate the member in the same direction.

ADOLPH ROSNER.